July 29, 1924.

S. A. HARRINGTON

WINDSHIELD SPRAYER

Filed Nov. 11, 1922

1,502,821

Inventor
S. A. Harrington

Goldberg
Attorney

Patented July 29, 1924.

1,502,821

UNITED STATES PATENT OFFICE.

SAMUEL A. HARRINGTON, OF PORTLAND, OREGON.

WINDSHIELD SPRAYER.

Application filed November 11, 1922. Serial No. 600,449.

*To all whom it may concern:*

Be it known that I, SAMUEL A. HARRINGTON, a citizen of the United States, residing at Portland, in the county of Multnomah and State of Oregon, have invented a new and useful Windshield Sprayer, of which the following is a specification.

My invention relates to improvements in windshield sprayers in which a pump in an automobile, near the driver's seat, forces a water repellant liquid through a perforated tube on top of the windshield.

The objects of my invention are:

First: To make provisions whereby the entire upper half of the windshield may be kept clear of rain.

Second: To produce an apparatus which permits the application of a water repellant liquid by manipulation from the driver's seat.

Third: To produce an apparatus which is simple in construction and easy to manipulate.

Further objects and advantages will be found in the construction and arrangement of parts as described in the specification and particularly pointed out in the appended claim.

I attain these objects with the mechanism illustrated in the accompanying drawing, in which.

Similar numerals refer to similar parts throughout the several views.

Figures 1, 2:
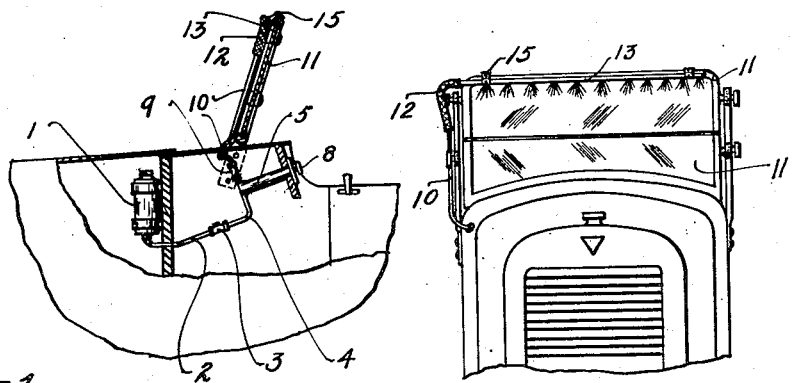
Fig. 1 illustrates the general arrangement of my device.
Fig. 2 shows the tube on the side and top of the wind shield.
Figure 3:
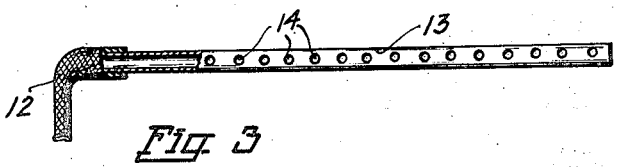
Fig. 3 is a detail of the perforated tube.
Figure 4:
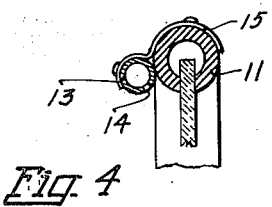
Fig. 4 is a cross section through the top of the windshield and the perforated tube.
Figure 5:
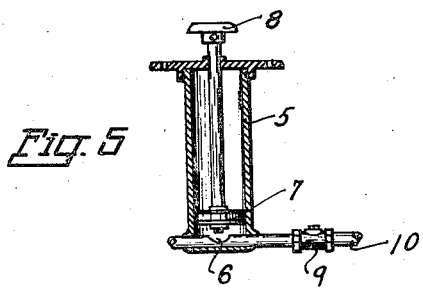
Fig. 5 shows the pump in detail.

A closed container 1, adapted to hold approximately one quart of any suitable water repellant liquid, is attached in any convenient place in an automobile, as for instance to the dash board under the hood shown in Fig. 1. A tube 2 leads from the bottom of the container to a one-way valve 3. The tube 4 from the valve traverses the bottom of the pump cylinder 5 (Fig. 5) diametrically, and is provided with an opening 6 through which the liquid from the container enters the pump cylinder when the piston 7 is withdrawn by means of the handle 8. Pressing the piston down sends the liquid through another one-way valve 9 into a tube 10 which latter rises at the side of the windshield 11, and is connected, by means of a flexible tube 12, with a perforated tube 13 at the upper edge of the windshield. The flexible tube permits a lowering of the windshield when desired. Through the perforations 14, the liquid is distributed uniformly over the glass area. The perforated tube may be held to the windshield by means of the clamps 15 shown in Fig. 4, or by any other siutable means.

It is well known that water repellant liquid should for the best results be applied on a wet glass. That usually means that the driver must descend from his seat in the rain to apply the liquid. Furthermore, in a protracted spell of rain application of the liquid must be repeated from time to time. If the pump is attached to the instrument board of the automobile as shown in Fig. 1, or any where else within reach of the driver, the liquid can be applied at any time and as often as necessary by the driver right from his seat.

Having thus described my invention it will be seen that my objects have been accomplished, and, though I have shown the preferred form of construction, I reserve to myself the right to make minor changes providing I do not violate the spirit or principle of my invention.

I claim:

A device of the character described, comprising in combination, an automobile dashboard, an instrument board, and a wind shield, a container attached to the dash board, manually operable pumping means inserted in the instrument board, said pumping means comprising a cylinder traversing the instrument board at right angles, a flange around the top of the cylinder, said flange being secured to the visible surface of said instrument board, a piston movably mounted in the cylinder, said piston having a handle extending beyond the top of the cylinder, a tube traversing the bottom of the cylinder diametrically, said tube having a lateral opening communicating with the cylinder and being air tight secured in the walls of the cylinder, a one-way valve secured in each end of said tube, clamps attached to the top of the wind shield, a perforated tube rigidly secured in the clamps, a rigid connecting tube between one of said valves and said container, and a flexible tube between the other of said valves and the perforated tube, whereby said perforated tube is capable of following the relative movements of the wind shield.

Signed by me at Portland, Oreg., this 6th day of November, 1922.

S. A. HARRINGTON.